United States Patent [19]
Cheng et al.

[11] Patent Number: 5,615,600
[45] Date of Patent: Apr. 1, 1997

[54] ROLLER BEARING PISTON

[76] Inventors: Chi Cheng; Akimi C. Cheng, both of 391 Western Ave., Clarendon Hills, Ill. 60514

[21] Appl. No.: 516,236

[22] Filed: Aug. 17, 1995

[51] Int. Cl.⁶ .......................................................... F16J 1/02
[52] U.S. Cl. ........................... 92/178; 92/208; 92/261; 123/193.6
[58] Field of Search ............................ 92/172, 208, 261; 123/193.6; 384/43

[56] References Cited

U.S. PATENT DOCUMENTS

| | | | |
|---|---|---|---|
| 3,398,653 | 8/1968 | Foster | 92/178 |
| 4,339,157 | 7/1982 | Olschewski et al. | 384/43 |
| 5,437,220 | 8/1995 | Cheng et al. | 92/178 |

*Primary Examiner*—Thomas E. Denion

[57] ABSTRACT

This invention relates to a piston with its skirt being cut to locate four sets of bearing pads and circulating roller bearings. Each pad has been milled to have a doughnut shaped groove with half of a roller cross-section to hold the roller bearing in circulation during the piston reciprocating motion. Two lines of roller bearings on each side of a piston pin are in contact with the cylinder liner and share the piston thrust load. Lubrication of the roller bearings is ensured by oil slots through the piston skirt under the oil ring groove to the top of the grooves of the bearing pads and to the exposed roller bearings in rolling contact.

10 Claims, 4 Drawing Sheets

FIGURE 7
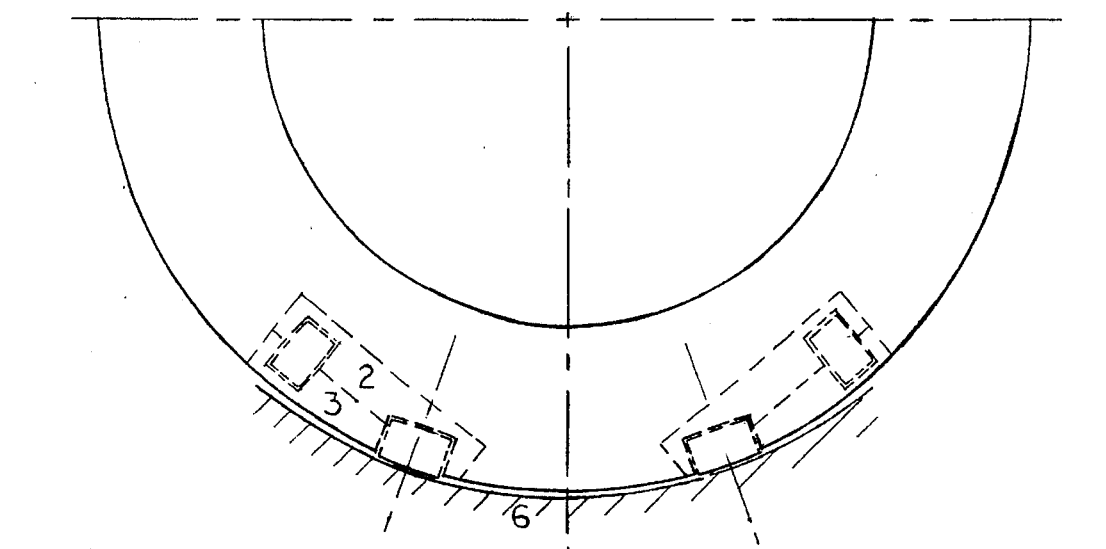
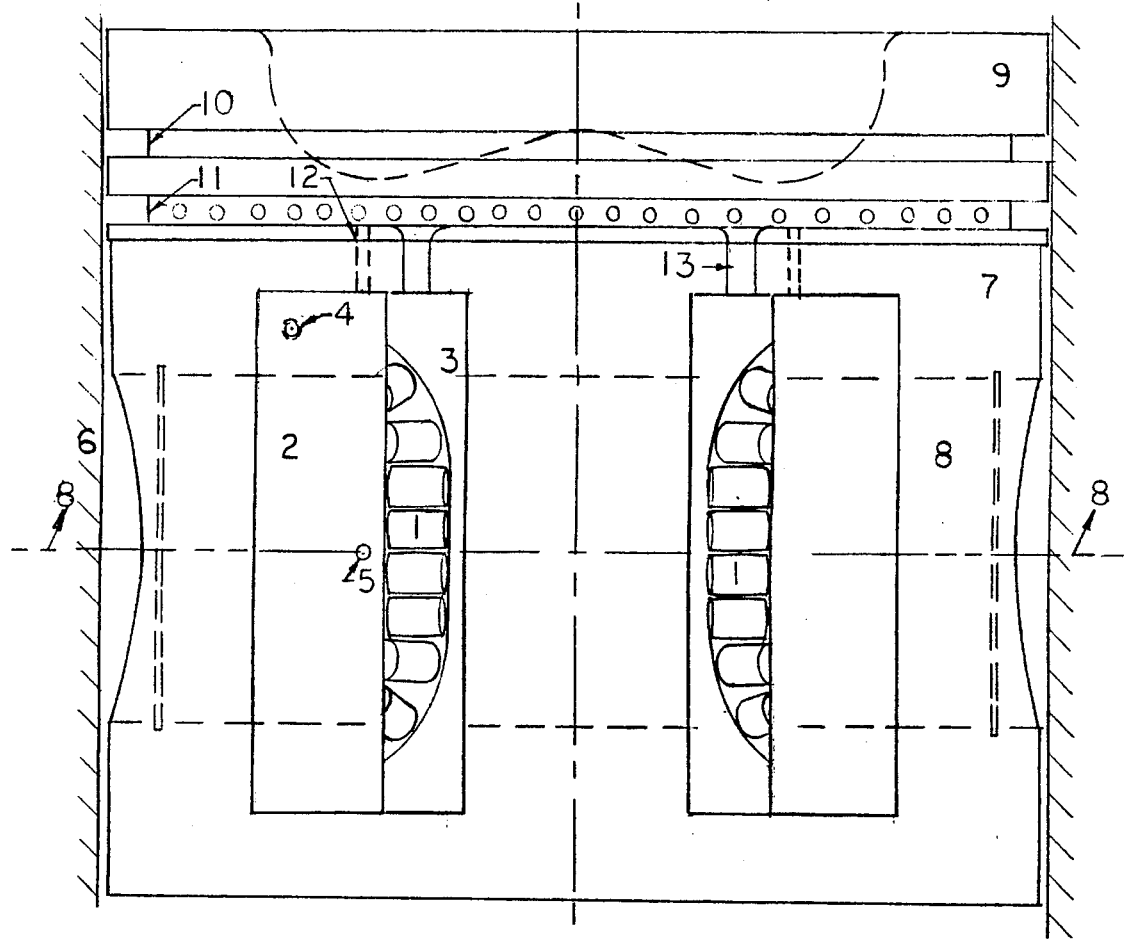
FIGURE 6

ROLLER BEARING PISTON

BACKGROUND OF THE INVENTION

The conventional internal combustion engine has a reciprocating piston in a cylinder liner. The piston motion has two dead positions at the top and the bottom (TDC and BDC). The oil film between the piston skirt and the cylinder liner breaks down when the piston reverses its direction of motion at both TDC and BDC. Oil film must be redeveloped and the coefficient of friction in sliding under oil boundary lubrication is high and around 0.1. The frictional power loss of all the pistons in the cylinder liners has accounted for almost 40% to 50% of all the engine's frictional-loss. If the engine has a mechanical efficiency of 85%, the frictional loss at the piston will be 6.0% to 7.5% of the engine's available horsepower.

A natural way to reduce the sliding frictional loss due to redeveloping an oil film between the piston skirt and the cylinder liner is to convert the sliding motion of the piston into a rolling motion with less friction. The coefficient of friction for pure rotation in oil is only 0.001 to 0.01 for a ball or roller. Like a ball bearing piston, roller bearings should be installed on the piston skirt. Such an idea leads to this invention of an anti-thrust roller bearing piston.

1. Field of the Invention

This invention relates to the field of anti-friction pistons. The reduction of the friction has been achieved through a piston with rollers in the skirt, a two piece piston with cylindrical barrel rollers or a spherical ball bearing, and a ball bearing from the same inventor.

2. Description of the Prior Art

Most of the prior patents utilized the rollers in the piston skirt or in the cylindrical barrel to withstand the piston thrust load under the peak firing load of the engine. Some patents use a single big spherical ball bearing. They all convert the sliding motion of a piston into the rotating motion.

U.S. Pat. No. 4,704,949, Piston to John D. Foster in 1987 uses two sets of three roller bearings mounted on a light weight piston skirt. It has the same advantages of the piston of U.S. Pat. No. 3,398,653 and reduces the required number of roller bearings to three. Each roller has an axle, a roller case and five small rollers within the case and around the axle. It seems that the case hardening of the piston skirt and the cylinder liner may have been considered. But the load carrying capacity of three axles will limit the maximum allowable thrust load of the piston and the engine horsepower.

U.S. Pat. No. 4,807,577, Peristrophic Internal Combustion Engine Assembly and Multi-Part Pistons, to Theodore Koutsoupidis in 1989 uses a two-part piston. The lower bearing piston may have a circumferential ring, cylindrical barrel rollers, or a spherical ball bearing arrangement. Either the rollers or spherical ball bearing will withstand the piston thrust load. Less piston friction due to bearing rotation will be achieved. But the piston becomes multiple parts. Also a single ball bearing has its load carrying capacity and will limit the engine's power rating.

U.S. Pat. No. 5,437,220, Ball Bearing Piston, to Chi Cheng in 1995 uses the same idea of this invention. Ball bearings are much easier to circulate while roller bearings will have more contact area against the cylinder liner.

Whatever the precise merits, features and advantages of the above cited references except the ball bearing piston, these pistons are relatively complex and only cover limited applications due to the load carrying capacity of the roller or ball. When the number of rollers and balls is reduced, the contact stress will be increased if the diameter of the roller and ball remains the same. The contact stress must be less than or equal to the contact strength of the cylinder liner or piston skirt in contact. Otherwise, the engine life will be sacrificed.

SUMMARY OF THE INVENTION

This invention is to convert the sliding motion of a reciprocating piston into a rolling motion of the roller bearing which is built in the piston skirt. The piston skirt at the thrust and anti-thrust sides has been cut to locate four sets of bearing pads and roller bearings.

The pads are composed of two symmetrical pads for a direct front and back roller circulation design or a base and cover for side by side roller circulation. Together, these pads provide a doughnut shaped groove, with a roller cross-section, to provide a tracking motion of the confined roller bearings. The front track is open in the front such that a full line of roller bearings protrude out of the pads and the recessed piston skirt. These partially exposed roller bearings ride and roll against the cylinder liner wall. The majority of the rollers are hiding inside the enclosed groove of the pads. The groove length is a little bit longer than the product of the number of the rollers and the roller diameter. The small clearance between two adjacent rollers allows all the rollers to roll simultaneously and to circulate within the groove during the reciprocating motion of the piston.

On either the thrust side or the anti-thrust side of the piston skirt, there are two sets of built-in pads and roller bearings. Each pad and roller set has one full line of roller bearings protruded out of the cover pad. The location of these exposed roller lines is by the edge of the slot inside the piston skirt where the connecting rod swings. These two lines of roller bearings in the two symmetric pads will roll against the cylinder liner and share the piston thrust load. Each line of roller bearings rolls up and down, and rollers retreat into the hidden groove track while new rollers come out to share the piston thrust load.

Holding the ability to circulate the roller bearings within the groove of the fixed size pads, we prefer to design a larger roller diameter and a smaller associate groove cross-section radius. Although the number of rollers will be inversely reduced, the total load capacity of roller bearings will be highly increased. This is mainly due to the fact that the loading capacity of the roller is not in proportion to the first power of its diameter but is in proportion to the third power of its diameter.

These protruding roller bearings on one side of the piston skirt are in full contact with the cylinder liner while the other protruding rollers have a small clearance to the cylinder liner wall or to the groove wall. The piston will be very straight with little tilting in its reciprocating motion because four lines of roller bearings will guide its motion. Piston rings are not required to share the piston thrust load and are easier to seat themselves in the piston ring grooves for the sealing of the combustion chamber. High ring tension is not necessary and the frictional loss at the ring location will be reduced because the rings are not under the thrust load, and ring tension is reduced. Due to the easiness for the rings to seat and seal, the number of the piston rings may be reduced.

This invention has shown that four sets of bearing pads are fabricated from steel and had its groove surface hardened through heat treatment or hard coating. The surface hardness of the groove of the pad must be around RC 60 and be compatible to the hardness of the roller bearings. In the optional design for a side by side roller circulation, base pads may be neglected if the piston skirt is steel based for a large engine of several thousand horsepower. These roller tracking grooves can be milled directly on top of the piston skirt, and only cover pads are needed. Similarly the surface hardness of the cylinder liner in contact to the roller bearings must be increased to around RC 60 such that a B10 life 10,000 hours can be achieved for the piston, bearings, and the cylinder liner.

For the lubrication of these roller bearings, the oil ring groove has four openings aligned over the four exposed roller bearings to distribute oil in the path of travel of the roller bearings. Also there are oil hole paths on top of the pads to supply oil to the groove.

The location of the pads and roller bearings in the height direction is symmetrical to the center line cross-sectional plane of the wrist pin. This distribution will spread the thrust load evenly on the roller bearings in contact.

BRIEF DESCRIPTION OF THE DRAWINGS

FIG. 6 is the front view of the other roller bearing piston with side by side roller circulation.

FIG. 7 is half of the symmetric top view of the roller bearing piston in FIG. 6.

DETAIL DESCRIPTION

Figure 2:
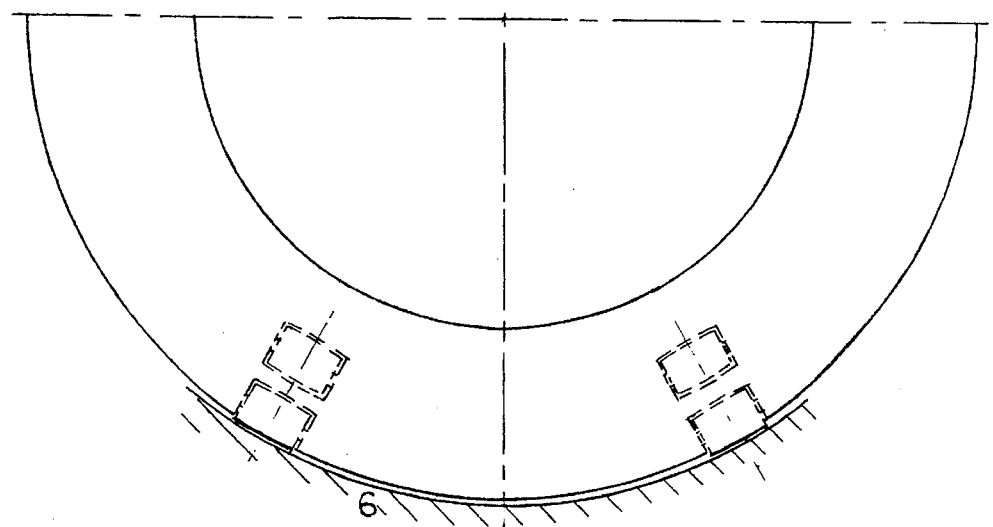
FIG. 2 is half of the symmetric top view of the roller bearing piston.
Figure 1:
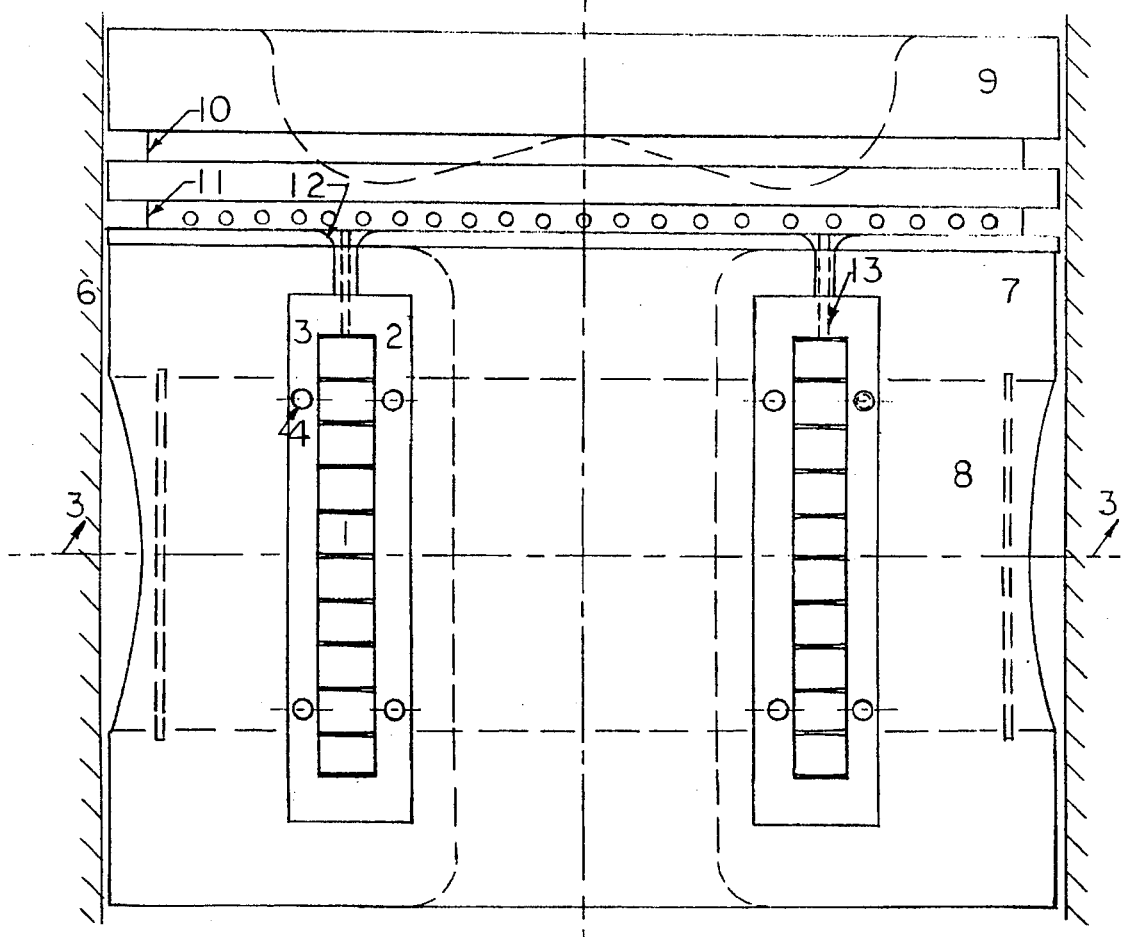
FIG. 1 is the front view of the roller bearing piston.

The roller bearing pistons in FIG. 1 and 6 have a piston head, #9, and a skirt #7. The piston head may-be a flat head, Mexican hat shape bowl, or another bowl shape. In this invention, the Mexican hat bowl shape is shown for convenience. The piston head also has ring grooves which include one to three compression ring grooves, #10, and one oil ring groove, #11. The number of compression rings and ring grooves depends on the engine's firing pressure and power rating. The piston skirt has a cylindrical opening, #8, to hold a piston wrist pin. The skirt diameter is recessed and less than the piston head diameter.

Figure 3:
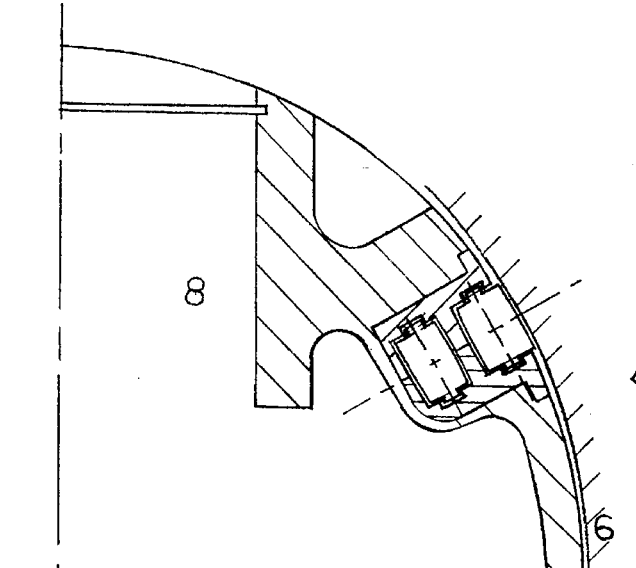
FIG. 3 is the schematic view of the cross-section A—A on the horizontal plane across the piston pin center-line.
Figure 4:
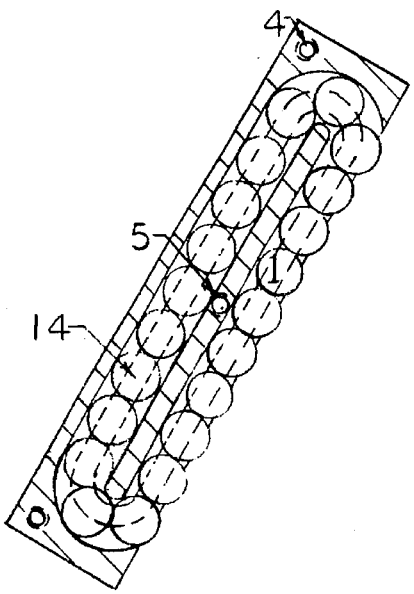
FIG. 4 is the schematic view of the cross-section B—B of the front to back roller circulation design.
Figure 5:
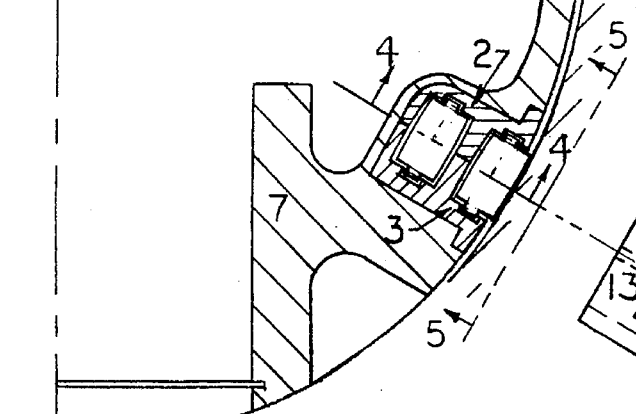
FIG. 5 is the schematic front view C—C of the bearing pad and its circulating rollers.
Figure 5:
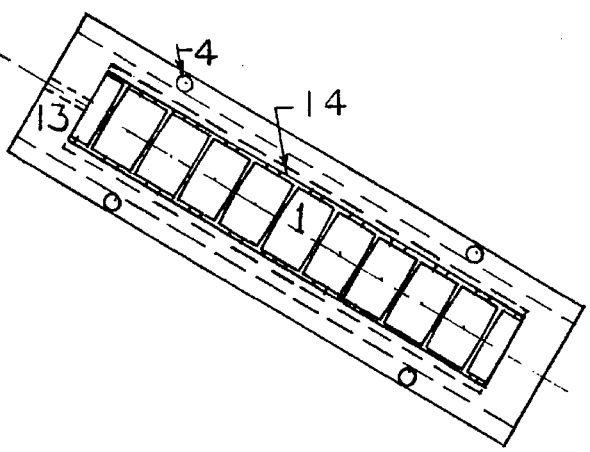

On the piston skirt, four rectangular recessed flat lands have been milled to hold four sets of bearing pads and roller bearings. FIG. 3 shows the horizontal view of the bearing pads in the piston skirt cross-section A—A. The roller bearing groove provides a front to back roller circulation. FIG. 4 shows the doughnut shape roller bearing groove. Also, it shows a doughnut shape slot where the protruding axle of the roller fits into the slot, and rolls to guide the motion of the roller bearings. The front track of the bearing groove of the pads is open in the front and a full line of protruding roller bearings rides and rolls against the cylinder liner wall. The riding view of the rollers and the front view of the bearing pads are shown in FIG. 5.

For the assembly of the two half bearing pads, #2 and #3, a pin, #5, will align them. At the two shoulders of the bearing pads, there are four screws, #4, to fasten the pads to the outer-diameter of the piston skirt.

Figure 8:
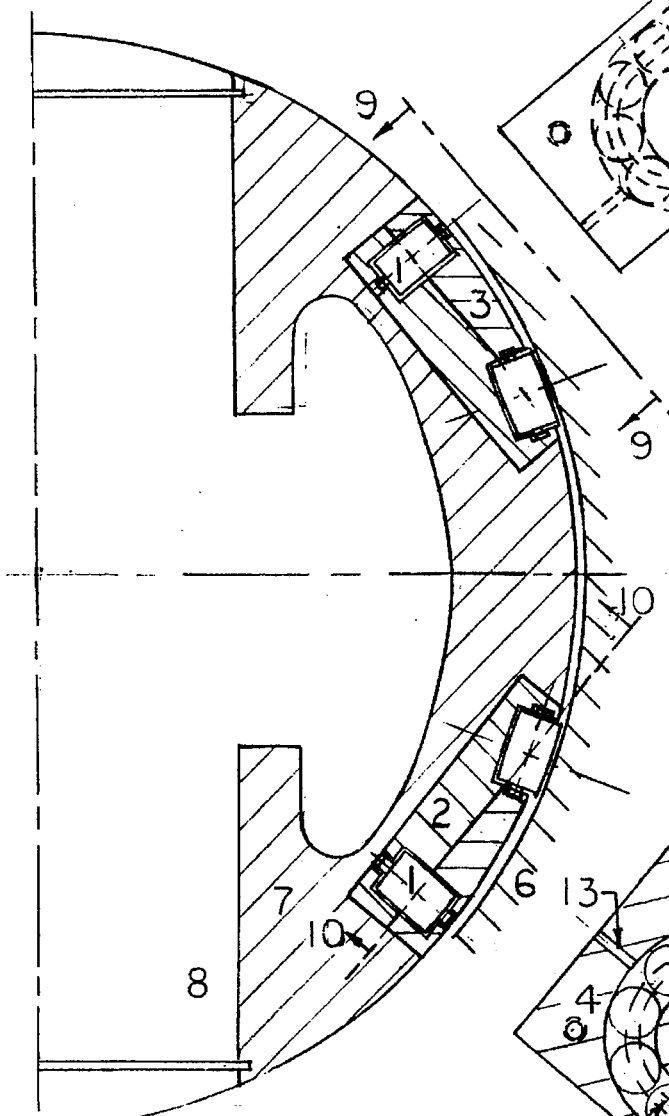
FIG. 8 is the schematic view of the cross-section A'—A' on the horizontal plane across the piston pin center line.
Figure 9:
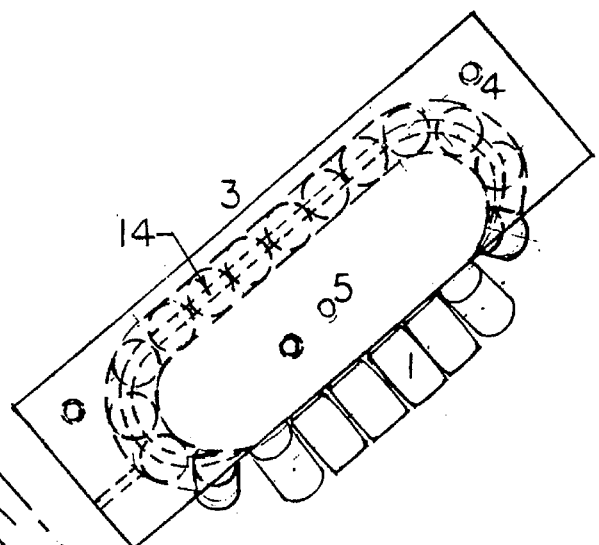
FIG. 9 is the schematic view of the cross-section B'—B' of the base pad and the side by side circulating roller bearings.

However, the front to back roller circulation in FIG. 1 to 5 may run into the same space where the connecting rod swings. Either the roller bearings need to be positioned outwards, or the side by side roller circulation should be considered. FIGS. 6 and 7 show the roller bearing piston with such a side by side roller circulation. The exposed roller bearings are still in parallel and in full contact to the cylinder liner-wall. The bearing pads and the roller bearings in circulation of the piston is shown in FIG. 8 too. FIG. 9 shows the cover pad and FIG. 10 the base pad. Both pads have a doughnut shaped roller bearing groove. Also, both pads have a doughnut shaped slot, #14, where the protruding axle of the rollers fits into the slot and rolls to guide the motion of the roller bearings.

Figure 10:
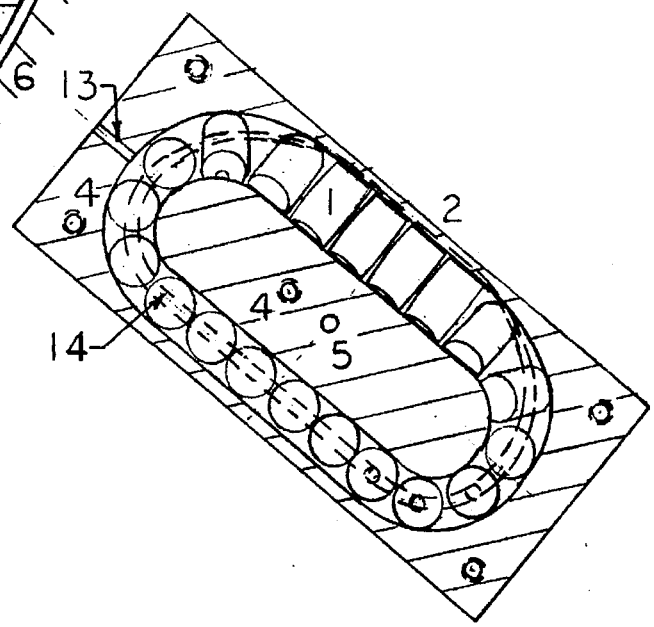
FIG. 10 is the schematic front view C'—C' of the covering pad and its circulating rollers.

In the side by side roller circulation, the plane where the roller bearing rolling motion occurs is at an angle to the plane of roller circulation. This roller bearing circulation is along the parting plane of the base and cover bearing pads. FIGS. 8 to 10 also show the roller bearing groove design to accommodate the rotation of the roller bearing and the roller circulation. The doughnut shaped guiding slot for the protruding axle of the roller swings outwards in the base pad and inward in the cover pad. When the roller bearing retreats from the line of contact against the cylinder liner wall, both the roller and its supporting track of the bearing groove sink along the outside diameter of the bearing groove. When the roller reaches either the top or bottom position of the circulating groove, the roller swings almost 90°, and the plane of roller rotation merges with the plane of roller circulation.

Similarly, a pin, #5, is used to align the base and cover pads, #2 and #3. Several screws, #4, are used to fasten the cover and base pads to the piston skirt.

In both designs of the roller bearing piston, FIGS. 1 and 6, four lines of roller bearings protrude out of the bearing pads and are in contact with the cylinder liner wall, #6. With a small clearance between the roller bearings and the cylinder liner wall in hot engine condition, the tilting of the piston will be minimal and the piston motion will be guided.

For lubrication, four slots, #12, are cut on the oil ring groove of the piston head to provide oil to the exposed roller bearings. These slots are aligned over the exposed rollers. Additional oil hole slots inside the piston skirt and the top of the pads, #13, will also supply oil to ensure full lubrication to the rolling contact.

If the piston skirt is steel in material instead of aluminum alloy, the back portion of the bearing pads in FIG. 1 or the base pad of FIG. 6 can be directly milled on the piston skirt. These grooves are hardened to RC 60 through heat treatment or coated with a hardened layer.

In the extremely large engine, a two piece piston is designed and used. A seperate piston skirt can be modified to install the circulating roller bearings for the same rolling contact. A small automotive engine may have six to eight small rollers in each of four bearing sets. Due to space limitation, base pads must be neglected and a steel piston skirt will provide part of the bearing groove. Also, grooves with a hard coating may provide the alternative for the roller bearing circulation.

Although preferred designs of the invention have been illustrated and described herein, this invention is intended to encompass any rearrangements, modification and substitution of the parts, elements and material, and circulation of the roller bearings with or without the cage that falls within the spirit of the appended claims.

We claim:

1. An anti-friction piston for use in an internal combustion engine or pump for reciprocating motion with a cylinder comprising:

a piston head of circular cross-section with either a bowl disposed therein or a flat head, two to four ring grooves disposed around an outer periphery thereof;

a piston skirt selected from the group consisting of a one-piece integral piston/skirt combination and two-piece articulated piston with detachable skirt portion;

four sets of bearing pads and four sets of plurality of roller bearings received in said pads, said pads and bearings being recessed in an outer periphery of said skirt with two sets of said pads and bearings on each side of a wrist pin, each of said bearing pads including two halves, inner and outer of near mirror images; and a plurality of locating pins and screws securing each of said pad sets and said plurality of roller bearings to said skirt.

2. The piston of claim 1 wherein said skirt has a milled portion to locate said bearing pads, the outside diameter of the piston skirt being flush with an outer portion of said bearing pad and being smaller than an outer diameter of said piston head.

3. The piston of claim 1 wherein both half pads of each of said pad sets contain mirror imaged, doughnut shaped bearing grooves and roller circulation guiding slots, and each of said outer pad halves is partial and open at a front thereof.

4. The piston of claim 1 wherein a portion of said plurality of roller bearings are disposed in a vertical orientation in contact with said cylinder.

5. The piston of claim 3 wherein sliding motion of the piston causes rolling motion of said bearings, said rolling motion of said bearings recirculates said bearings around said bearing grooves.

6. The piston of claim 1 wherein each of said bearing pads is located symmetrical to a center line of the wrist pin in a vertical direction such that the thrust loads produced by said piston are evenly distributed over two lines of said bearings.

7. The piston of claim 1 wherein each of said inner and outer bearing pads contain a full width inner portion and a partial width outer portion, each of said pads have a doughnut shape bearing groove therein and a skew roller bearing guiding slot, said plurality of roller bearings include a small axle extending outward of a center portion on both sides.

8. The piston in claim 7 wherein the axles swing vertically into positions vertical to a side roller circulation plane during their retreat from the contact with the cylinder liner to a hidden portion of a recirculation groove.

9. The piston of claim 1 wherein two lines of bearings are formed on each of a thrust side and an anti-thrust side of said piston, said two lines alternatively resist piston thrust and anti-thrust loading.

10. The piston of claim 1 wherein at least one of said ring grooves has a reduced-tension piston ring disposed therein.

* * * * *